Nov. 4, 1924.
E. L. WILKE
METHOD OF MELTING SCRAP METAL
Filed Dec. 4, 1922
1,513,875
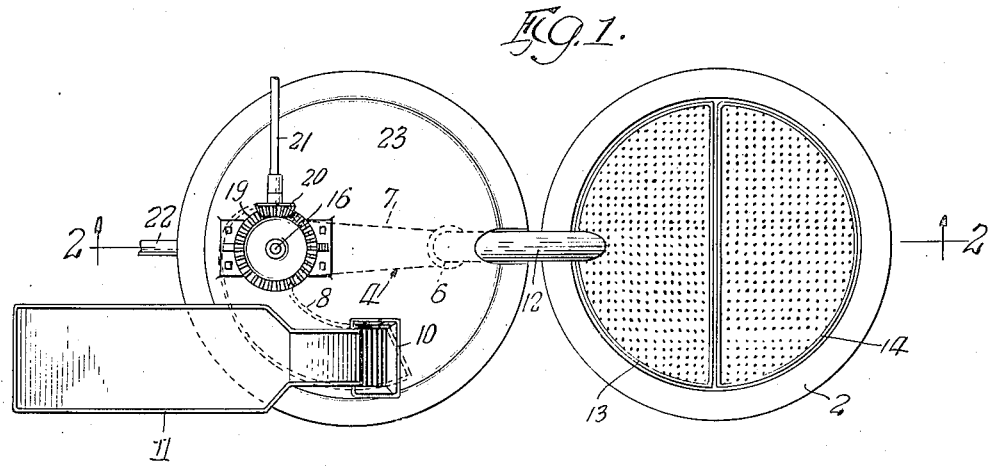
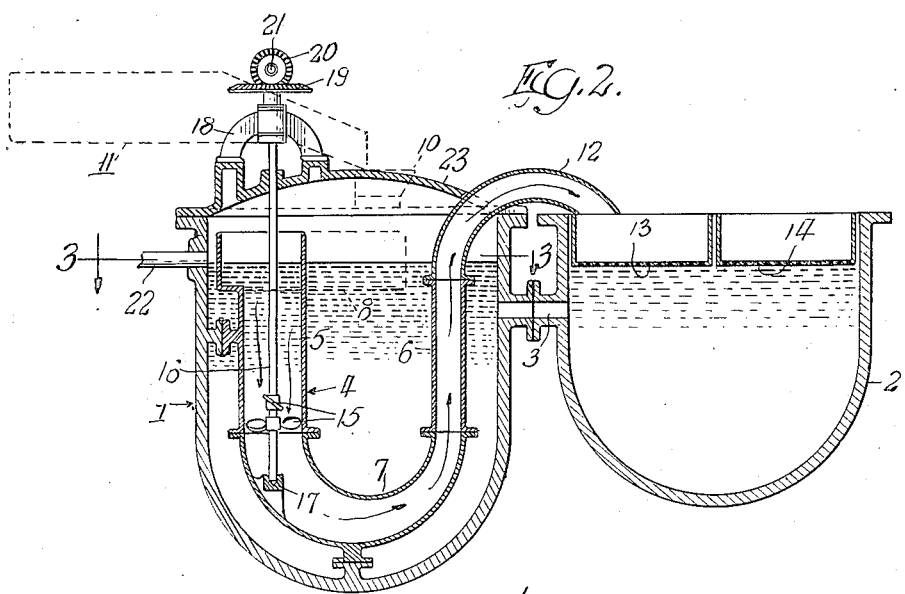
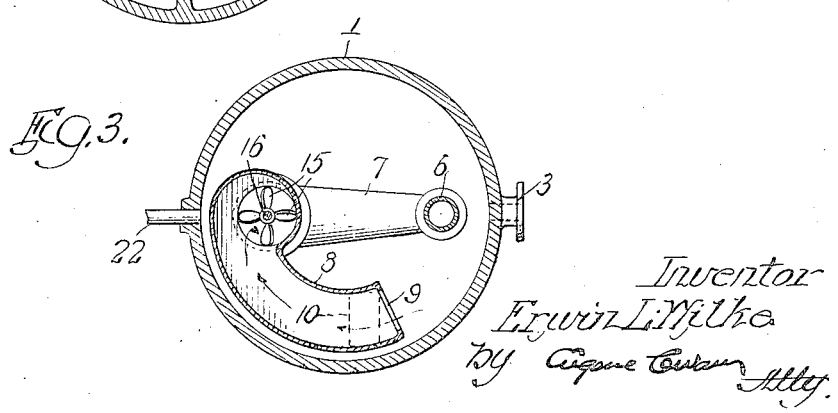

Patented Nov. 4, 1924.

1,513,875

UNITED STATES PATENT OFFICE.

ERWIN L. WILKE, OF HAMMOND, INDIANA, ASSIGNOR TO METALS REFINING COMPANY, OF HAMMOND, INDIANA, A CORPORATION OF INDIANA.

METHOD OF MELTING SCRAP METAL.

Application filed December 4, 1922. Serial No. 604,663.

*To all whom it may concern:*

Be it known that I, ERWIN L. WILKE, a citizen of the United States, residing at Hammond, in the county of Lake and State of Indiana, have invented new and useful Improvements in Methods of Melting Scrap Metal, of which the following is a specification.

This invention relates to a method of melting scrap metal.

The main object of my invention is to melt scrap metal by introducing the same into a moving stream of molten metal, preferably of the same kind as the scrap, so that the scrap will be rapidly melted by being completely surrounded by the larger mass of the stream and the heat of the latter quickly imparted to the relatively smaller mass of scrap introduced into the same.

The invention has particular reference to melting scrap battery plates, and consists further in the matters hereinafter described and more particularly set forth in the appended claims.

In the accompanying drawings—

Fig. 1 is a top plan view of an apparatus carrying out the method of my invention;

Fig. 2 is a vertical longitudinal sectional view taken on line 2—2 of Fig. 1; and Fig. 3 is a horizontal sectional view taken on line 3—3 of Fig. 2.

The apparatus shown in the drawings has two crucibles or pots 1, 2, preferably arranged close together and designed to contain molten metal of the kind used for the scrap being handled. When melting scrap battery plates, the pots contain molten antimonial lead. Said pots 1, 2 are connected together adjacent their upper ends by a conduit 3, so that the level in both will be substantially the same. Any suitable form of means may be employed for heating the pots to keep the metal therein in a molten condition.

Submerged in the pot 1 is a conduit 4 substantially U-shape in form when the device is as shown in the drawings. This provides the conduit with vertical inlet and outlet sections 5, 6, respectively, and a connecting bottom section 7. The section 5 opens at its upper end into a horizontally arranged trough 8 curved in an arc of a circle concentric to that of the pot 1 and projecting above the level of the molten metal therein. Said trough 8 extends more than 90° from its entrance into the conduit section 5 and at its outer end has an inlet 9 submerged in the molten metal to allow the same to flow through from the pot into the conduit through the trough.

To feed the scrap metal being handled into the trough 8, I provide a hopper 10 arranged to discharge into the trough adjacent its inlet 9. This hopper, in the particular form of apparatus shown, has a feed table 11 associated with it.

The conduit section 6 has its upper end connected with a discharge section or spout 12, which extends above the pot 1 and over the same to the pot 2. The spout 12 discharges into the pot 2 through baskets 13, 14. These have foraminated or perforated bottoms, as shown, to allow the molten metal discharged therein to drain into the pot 2. The purpose of the baskets will be presently mentioned.

Molten metal is caused to flow through the conduit 4 from the pot 1 by one or more impellers 15 arranged in the conduit 4 on a vertical shaft 16. This shaft has a stepped bearing at 17 in the conduit section 7 and extends upward out of the section 5 and above the trough 8, as shown. The upper end of said shaft 16 is journaled in a standard 18 and carries a beveled gear 19. This is in mesh with a beveled pinion 20 on a shaft 21, whereby power may be imparted to the shaft 16 for rotating the impellers 15. The impellers 15 are located below the inlet end of the section 5 with the trough 8, and the action of the device is to draw a stream of molten metal from the pot 1 into the conduit 4 and discharge it into the pot 2 through the spout 12.

Scrap metal is fed into the trough 8 at a point spaced from the conduit section 5 and is thus introduced into the stream of molten metal and preheated thereby before the latter reaches the vortex at the inlet into said sections. This allows the moving stream or mass of molten metal to completely submerge and surround the introduced scrap before the latter reaches the conduit 4 and thus be substantially if not completely melted before moving into the conduit. During the passage through the conduit, any unmelted scrap will be entirely melted before the stream is discharged into the pot 2 as the conduit is heated by the molten metal in the pot 1.

Any material in the mixture which is not melted will be collected by the baskets 13, 14 as dross. Said baskets are made semi-circular in shape and float on the molten metal in the pot 2. When one basket becomes filled with dross, the empty one is turned under the spout 12, and the filled one is removed and emptied. The pot 1 has an overflow pipe 22 to carry off the metal recovered by the process, and there is a cover 23 for said pot.

My invention is particularly applicable for melting scrap battery plates. The metal body of these plates is an alloy of lead and antimony. These plates are covered with what is termed "paste," which contains lead oxide. It is the design of my invention to melt the antimonial lead forming the body of these plates, and to do this the molten metal in the pots 1 and 2 is lead of the same kind. The "paste" will not melt during the process and that is collected as dross in the baskets 13 and 14. The latter may be refined for obtaining the metallic lead therefrom.

Introducing the scrap metal into a moving stream of molten metal allows the heat of the larger mass to be given off more rapidly to the smaller mass of scrap and more quickly melt the latter. Moreover, the moving stream of molten metal carries the scrap as introduced away from the place of introduction, so that there is no accumulation of scrap metal in the stream to prevent a complete immersion and surrounding of the scrap with molten metal. Melting the scrap in this way does it quickly, in that the molten metal has a chance to completely surround the scrap and give off its heat with much more rapidity than should the scrap be thrown on top of a relatively passive mass of molten metal and be allowed to melt by a gradual immersion, or in cases where large batches of scrap are thrown into a passive mass of molten metal and allowed to melt, because in that case the particles of scrap lie one against the other and prevent the rapid immersion of the scrap on all sides by the molten metal.

While I have described herein the process and apparatus of my invention for melting antimonial lead as contained in scrap battery plates, it is of course to be understood that my invention is applicable to melting scrap of other metal, and I do not wish to be restricted to any particular use except as may be limited by the annexed claims. Moreover, the term "conduit" used in the claims includes the entire conduit from the inlet of the trough 8 to the outlet of the discharge spout 12, unless otherwise indicated, and, as shown in the drawings, this conduit is submerged for the greater portion of its length in the molten metal in pot 1. In this connection, the inlet of the conduit is at the inlet of the trough 8. Where the latter opens in the conduit section 5, the trough walls are given somewhat spiral form with respect to the section inlet in order to provide a swirl of molten metal at the vortex and thus insure proper agitation of the mixture to completely submerge and separate all scrap parts that may tend to cling together

I claim as my invention:

1. The method of melting scrap metal, which consists in introducing the scrap into a moving stream of molten metal, and discharging the mixture of the stream into a separating device for removing the non-melted portions of scrap therefrom.

2. The method of melting scrap metal, which consists in moving molten metal in a stream from a mass of said molten metal through a conduit the greater portion of which is submerged in said mass of molten metal to be heated thereby, introducing the scrap into the stream at the inlet of the conduit, and discharging the mixture from the conduit into a separating device for removing the dross therefrom.

3. The method of melting scrap metal, which consists in inducing molten metal to flow from a mass of the same into a conduit in a manner creating a vortex at the inlet of the conduit, and introducing the scrap metal into the molten metal to be preheated before entering the conduit at said vortex.

4. The method of melting scrap metal, which consists in inducing molten metal to flow from a mass of the same into a conduit by making the molten metal take a circular path before entering the conduit to create a vortex at the inlet of the conduit, and introducing the scrap metal into the molten metal as the latter takes its circular path to preheat the scrap metal before entering the conduit at said vortex.

5. The method of melting scrap metal, which consists in inducing molten metal to flow from a mass thereof into a conduit the greater portion of which is submerged in said mass of molten metal to be heated thereby, causing the molten metal on entering the conduit to take a circular path for creating a vortex at the inlet of the conduit, and introducing the scrap metal into the molten metal to preheat it before entering the conduit at said vortex.

6. The method of melting scrap metal, which consists in inducing molten metal to flow from a mass thereof into a conduit the greater portion of which is submerged in said mass of molten metal to be heated thereby, causing the molten metal on entering the conduit to take a circular path for creating a vortex at the inlet of the conduit, introducing the scrap metal into the molten metal to preheat it before entering the conduit at said vortex, and discharging the mixture from the conduit into a separating device for removing the dross therefrom.

7. The method of melting scrap metal, which consists in inducing molten metal to flow from a mass thereof into a conduit the greater portion of which is submerged in the mass of molten metal to be heated thereby and having its inlet just below the level of the mass and its outlet exterior of the same, causing the molten metal on entering the conduit to take a circular path for creating a vortex at the inlet of the conduit, introducing the scrap metal into the molten metal to be preheated before entering the conduit at said vortex, and discharging the mixture from the conduit through the outlet end thereof.

8. The method of melting scrap battery plates, which consists in melting in a pot a mass of metal of the kind to be melted out of the plates, causing the molten metal to flow from the pot into a conduit submerged therein, causing the molten metal on entering the conduit to take a circular path for creating a vortex at the inlet of the conduit, introducing scrap battery plates into the pot in advance of the inlet of the conduit for preheating the scrap plates before entering the conduit, discharging the mixture from the conduit from the outlet end thereof into another pot, having the pots in communication for feeding one by the other, and taking off the molten metal produced by the method from one of said pots.

9. The method of melting scrap metal, which consists in introducing the scrap into a moving stream of molten metal, moving the mixture forward, whereby the metal in the scrap is melted, and then separating the non-melted portion of the scrap from the mixture.

In testimony that I claim the foregoing as my invention, I affix my signature, this 29 day of November, A. D. 1922.

ERWIN L. WILKE.